2,831,494

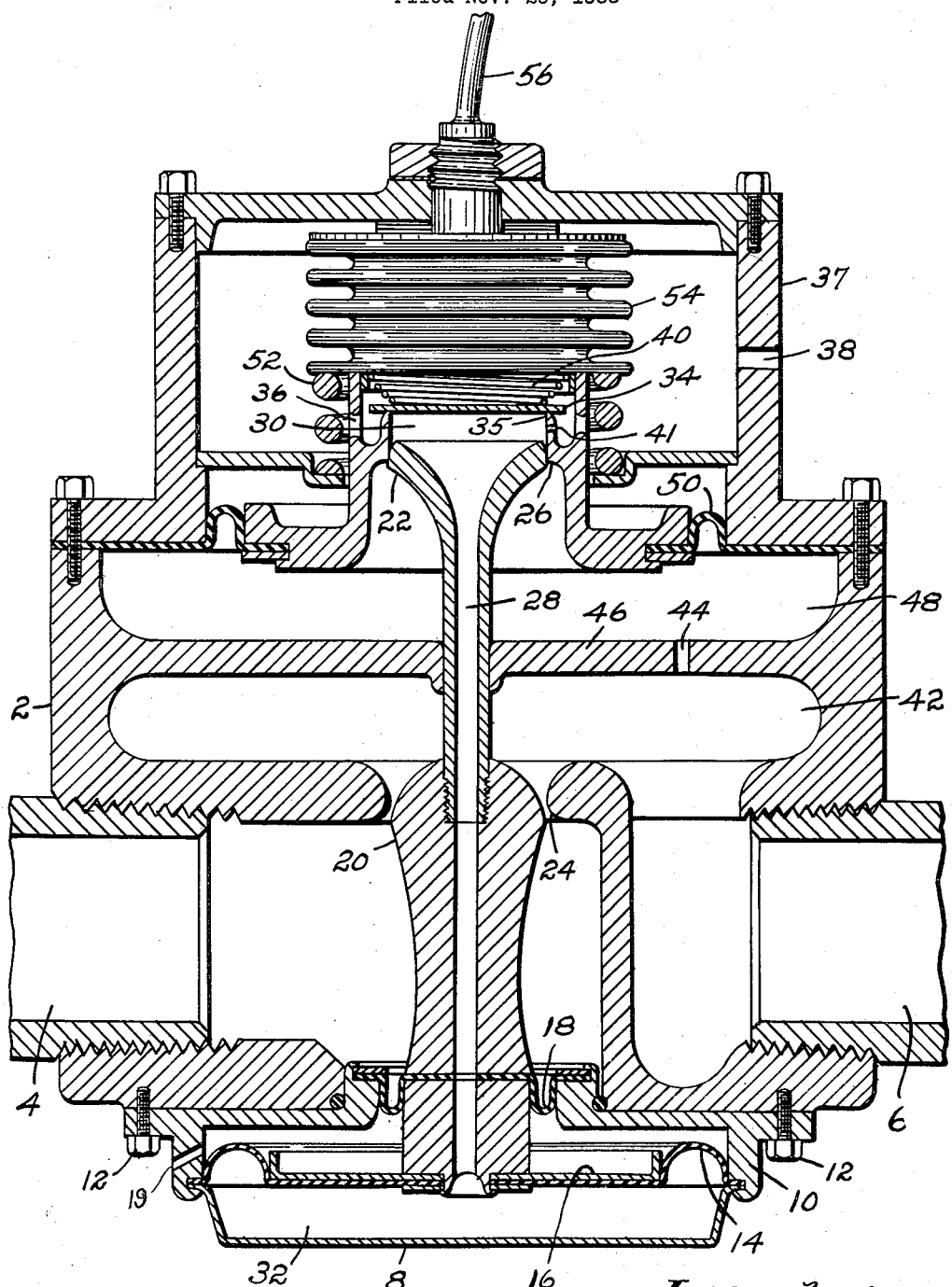

INDIRECT OPERATED PRESSURE CONTROLLER

John F. Taplin, West Newton, Mass., assignor to Fairchild Engine and Airplane Corporation, Bay Shore, N. Y., a corporation of Maryland Application November 29, 1955, Serial No. 549,616

12 Claims. (Cl. 137—116.5)

This invention relates to fluid pressure controlling mechanism.

It is an object of this invention to provide a fluid pressure controller that is adapted to maintain the pressure on the downstream side of said controller substantially constant regardless of the fluid consumption.

Another object of this invention is to provide a pressure controller having means for permitting escape of excess pressure from the downstream side of said controller when such condition develops.

Still another object of this invention is to provide a controller having means providing substantially instantaneous response to changes in downstream pressure to permit flow of additional high pressure fluid from the upstream side to restore the downstream pressure to its original desired value.

Other objects and many of the attendant advantages of the present invention may be readily appreciated as the same becomes better understood by reference to the detailed description when considered with the accompanying drawings, wherein:

The single figure is a vertical section taken approximately through the center of the controller. The controller has a housing 2 containing an inlet port 4, and an outlet port 6. A bottom closure member 8 is also affixed to the housing by the intermediate plate 10 secured by studs 12. A diaphragm 14 and associated piston plate 16 is affixed to a balanced diaphragm 18 which in turn is connected to a supply valve pintle 20 and its associated pilot valve pintle 22. A port 19 permits atmospheric pressure between diaphragms 14 and 18. Diaphragm 18 is responsive to fluid pressure on the inlet side of said supply valve and urges supply valve pintle 20 away from its cooperating valve seat 24 and pilot valve pintle 22 away from its cooperating valve seat 26. Supply valve pintle 20 and seat 24 cooperate to form a supply valve, and pilot pintle 22 and seat 26 cooperate to form a pilot valve.

The connected valve pintles 20 and 22 are free to slide vertically with respect to partition 46 and contain a concentric bore 28 allowing free passages of air from pilot pressure chamber 30 into the actuator pressure chamber 32. The pressure present in chamber 32 acts to urge both valve pintles 20 and 22 toward their respective valve seats 24 and 26. Air pressure in chamber 30 can flow to atmosphere by over-powering poppet valve disc 34 and flow out through passages 36 into the under side of valve bonnet 37 and from there to atmosphere through port 38.

The valve disc 34 is loaded mechanically by the valve disc loading spring 40. The under face of the said valve disc 34 is notched or scratched in order to provide sufficient irregularities forming a restricted passageway of fixed dimensions so that there will be a small constant fluid leakage flow past valve disc 34 to obtain the desired pilot action. In a modified form the valve disc 34 might sit tightly on its seat with the leakage taking place through one or more small holes 41.

The downstream pressure in outlet 6 and also in chamber 42 is free to flow through the restricted passage or feed-back conduit 44 contained in the fixed partition or barrier plate 46 separating expansion chamber 42 and pressure control chamber 48. The fluid pressure in chamber 48 referred to as the control chamber pressure acts upwardly on the main movable control diaphragm 50 which is firmly attached at its inward periphery to the bottom surfaces of the downward extension of the pilot valve seat 26.

The pilot seat assembly, which includes the seat 26, is also acted upon in a downward direction by the combination of a range spring 52 and a loading bellows 54. The bellows 54 is supplied with fluid pressure by means of a conduit 56.

Operation of the controller when connected to a source of high pressure at port number 4 and to downstream apparatus at port number 6 is as follows:

It might be well to mention at the outset that the range spring 52 and the pressure bellows 54 are representative only of a number of forces of any selected magnitude which may take other forms as, for example, mechanical weights, fluid loaded diaphragms, etc. It is to be noted that the two forces applied by spring 52 and bellows 54 may be replaced by any other force, either fixed or adjustable remotely and that these forces act together as a unit upon the pilot valve seat 26 which in turn is constrained to move only in an axial direction.

If the downstream pressure, as evidenced by the pressure in chamber 42 and also in port 6, drops below the predetermined pressure for which the device is set (said set value being determined by the sum forces of spring 52 and the value of the hydro-static pressure of the fluid in the bellows 54) diaphragm 50 under the influence of these two forces moves downwardly causing likewise a similar motion of pilot valve seat 26 which in turn reduces the orifice area between the seat 26 and the associated pilot valve pintle 22. It should also be noted that the air pressure in pilot pressure chamber 30 is allowed to bleed off at a very small bleed rate due to the imperfect seat between the underside of disc 34 and associated seating surface 35. The above mentioned decrease in the flow area between the pilot valve pintle 22 and its pilot valve seat 26 results in a decrease in pilot air flow from pressure control chamber 48 past pilot valve pintle 22 and pilot valve seat 26 and through the fixed restriction formed by the disc 34 and its associated seat 35. This decreased pilot air flow flowing through pilot pressure chamber 30 causes the pilot pressure therein to diminsh, which in turn causes a similar lessening of the pressure in conduit 28 and actuator pressure chamber 32. As a result of the reduction of air pressure in the chamber 32, the main supply valve pintle 20 has a similar reduction in upward force acting upon it, and at the same time, all other forces acting upon the pintle have remained undiminished and unchanged.

Thus the fluid pressure in the pilot pressure chamber 30 is a function of the size of the passage or exit opening present between valve pintle 22 and valve seat 26 whereby pressure from the pressure control chamber 48 flowing into pilot pressure chamber 30 causes variations in the latter according to varying size of the pilot valve passage.

As a consequence of the reduced force acting upwardly on diaphragm 14, said supply valve pintle 20 will increase its opening by a small amount with respect to its seat 24 due to the fixed and constant opening force produced by the fluid supply pressure acting downwardly in diaphragm 18.

The increased aperture between the supply valve seat 24 and supply valve pintle 20 allows additional fluid pressure to flow into chamber 42 and into port 6. This increase in flow continues unless and until the pressure in chamber 42 and in port 6 as well as the identical pressure in control chamber 48 (due to the free interchange of the fluid through conduit 44) produces a pressure force acting upward upon range diaphragm 50 to again balance the total downward force due to the spring 52 and the loading bellows 54. When the upward force acting upon the diaphragm 50 is equal to the resultant downward force from bellows 54 and spring 52, the controller is then in equilibrium and the fluid pressure in chamber 42 and downstream port 6 has a value equal to the desired value of the instrument.

If the downstream conduit 6 is connected to a relatively large unit having a substantial amount of air capacity and if under these conditions it is desired that the set or required value of the downstream pressure is to be reduced then the controller must allow fluid to flow backward through port 6 into control chamber 48 past the variable orifice between pilot valve pintle 22 and seat 26, past blow-off disc 34 out into the under side of the bonnet and thence to atmosphere.

This last mentioned sequence of events is accomplished as follows:

If, for example, the pressure in the conduit 56 is diminished by some remote operation then the downward force acting from bellows 54 is likewise diminished and as a consequence the pilot valve seat 26, the top of spring 52, the bottom end of the pilot seat and the inner periphery of diaphragm 50 all move upwardly, since the pressure forces in chamber 48 acting on range diaphragm 50 are now in excess of the sum of downward forces of the bellows 54 and the spring 52.

This upward motion of the pilot valve seat 26 and associated parts increases by a substantial amount the opening of the orifice between pilot valve seat 26 and cooperating pilot valve pintle 22, allowing fluid to escape quickly from pressure control chamber 48 into pilot pressure chamber 30. From that point the fluid pressure is communicated through conduit 28 to the loading chamber 32, said pressure applying a substantial upward force on pilot diaphragm 14 thrusting supply valve pintle 20 upwardly against supply valve seat 24, causing complete stoppage of supply air flowing past supply valve seat 24.

At the same time the exhaust fluid blowing through the enlarged opening between pilot valve seat 26 and pintle 22 rushes into chamber 30 and overpowers the spring 40 and its associated poppet safety valve disc 34 thereby to flow between the poppet valve disc 34 and associated seat 35 radially outward into the inside of pilot valve bonnet and thence to the atmosphere.

This relief flow past the pilot valve and poppet safety valve continues until the amount of air left in downstream chamber 42, the downstream port 6 and mechanism associated with the downstream side of the controller is the correct amount. Under these conditions the pressure in the downstream port 6, in chamber 42 and in the control chamber 48 will be of identical value, and the upward thrust due to this pressure acting on range diaphragm 50 will just offset the combination of the downward thrust developed by the bellows 54 and associated spring 52.

In practice, during normal operation, the flow of air that bleeds past pilot valve pintle 22 and associated pilot valve seat 26 continuously changes by extremely small amounts, thereby changing the value of pilot pressure in chamber 30, and likewise in conduit 28 and diaphragm chamber 32.

By utilizing this indirect pilot action, the main valving mechanism of the controller, namely supply valve pintle 20 in relation to valve seat 24, is motivated by the diaphragm 14 and the related motion of the pilot valve pintle 22 and seat 26. Since the sensing elements of this controller (said sensing elements consisting of input spring 52 and bellows 54, as well as the feed-back element consisting of range diaphragm 50) do no physical work, but instead only modulate the amount of pilot air escaping between pilot valve pintle 22 and pilot valve seat 26, the inherent accuracy of the above described controller is very high. At the same time, the main valving forces required to handle the main fluid flow can be of substantial dimensions due to the large pressure area of diaphragm 14 and, therefore, the large motivating forces generated by the pressure fed thereto through conduit 28.

Obviously many modifications and variations are possible in the light of the above teaching. Therefore, it is to be understood that within the scope of the appended claims, the invention may be practiced otherwise than specifically described above.

I claim:

1. A pressure regulator valve comprising a casing having an inlet port and an outlet port, a supply valve including a supply valve seat and a supply valve pintle between said ports, an expansion chamber on the outlet side of said supply valve, a pressure control chamber comprising a fixed partition forming one wall and a movable diaphragm forming another wall, said partition having a restricted passage leading from the outlet side of said supply valve into said pressure control chamber, a pilot valve seat carried by said diaphragm and movable therewith, a pilot valve pintle for cooperating with said pilot valve seat to form a pilot valve for varying the flow thereby from said pressure control chamber, said supply valve pintle and pilot valve pintle being connected to each other whereby axial movement of one valve pintle will cause corresponding movement of the other valve pintle to correspondingly control flow thereby, a pilot pressure chamber on the outlet side of said pilot valve, said pilot pressure chamber having a restricted passageway of fixed dimension for bleeding therefrom the pressure therein, means responsive to the fluid pressure on the inlet side of said supply valve urging said supply valve pintle away from said supply valve seat, and means responsive to the pressure in said pilot pressure chamber urging said valve pintles toward said valve seats.

2. A fluid pressure regulator valve as defined by claim 1, wherein said pilot pressure chamber is provided with a poppet valve for rapidly venting said chamber when the pressure therein exceeds a predetermined limit.

3. A fluid pressure regulator valve as defined by claim 1, wherein said last mentioned means comprises a fluid pressure actuator having a flexible diaphragm associated with said supply valve pintle for causing axial movement of said pintle, and means forming together with said flexible diaphragm an actuator pressure chamber, and means connecting said actuator pressure chamber and said pilot pressure chamber whereby said flexible diaphragm is subjected to the pressure in said pilot pressure chamber.

4. A fluid pressure regulator valve as defined by claim 1, further including fluid pressure actuated means responsive to an exterior signal pressure for urging said pilot valve seat toward said pilot valve pintle.

5. A pressure regulator valve comprising a casing having an inlet port and an outlet port, a main supply valve comprising a supply valve seat and a supply valve pintle located intermediate said ports, pressure responsive means urging said supply valve pintle away from said supply valve seat, a fluid pressure responsive actuator for urging said supply valve pintle toward said supply valve seat, said actuator comprising a first diaphragm operatively coupled to said supply valve pintle and wall means forming an actuator pressure chamber for said diaphragm, a pressure control chamber comprising a fixed wall having a restricted passageway communicating with the outlet side of said supply valve and a movable wall comprising a second diaphragm and a pilot valve seat carried by said second diaphragm, a pilot valve pintle cooperating with said pilot valve seat to form a pilot valve, said pilot valve pintle operatively associated with said supply valve pintle whereby movement of one pintle toward its valve seat causes corresponding movement of the other pintle toward its valve seat, and means defining a pilot pressure chamber on the outlet side of said pilot valve, said pilot pressure chamber having a bleed opening of fixed size for bleeding fluid from said pilot pressure chamber, whereby the fluid pressure in said pilot pressure chamber is a function of the size of the exit opening presented by said pilot valve to fluid contained within said pressure control chamber, said pilot pressure chamber being connected to said actuator pressure chamber whereby said first diaphragm is subjected to the pressure in said pilot pressure chamber.

6. A pressure regulator as defined by claim 5, wherein said valve pintles are connected to each other in axial alinement intermediate said pilot pressure chamber and the pressure chamber of said supply valve actuator, said valve pintles having internal axial passageways in series leading from said pilot pressure chamber to said actuator pressure chamber.

7. A pressure regulator valve as defined by claim 5, wherein the said pilot pressure chamber comprises a peripheral wall and a top wall both of which are movable with said pilot valve seat.

8. A pressure regulator valve as defined by claim 7, wherein said peripheral wall is integral with said pilot valve seat.

9. A pressure regulator valve as defined by claim 8, wherein said top wall is a separate member, and further including bias means urging said top wall into seating engagement with said peripheral wall.

10. A pressure regulator valve as defined by claim 9, wherein said top wall is movable away from said peripheral wall when the pressure in said pilot pressure chamber reaches a predetermined limit sufficient to overcome said bias means, whereby to rapidly relieve the pressure in said pilot pressure chamber.

11. A pressure regulator valve as defined by claim 9, wherein said fixed bleed opening comprises a space provided between said top wall and said peripheral wall.

12. A pressure regulator valve as defined by claim 5, further including means responsive to an applied signal pressure for urging said pilot valve seat toward said pilot valve pintle to reduce the exit opening of said pressure control chamber thereby to reduce the pressure in said pilot pressure chamber.

References Cited in the file of this patent

UNITED STATES PATENTS

| | | |
|---|---|---|
| 2,239,116 | Ray | Apr. 22, 1941 |
| 2,278,728 | McKinley | Apr. 7, 1942 |
| 2,707,966 | Taplin | May 10, 1955 |